US008393657B1

(12) United States Patent
Duderstadt (10) Patent No.: US 8,393,657 B1
(45) Date of Patent: Mar. 12, 2013

(54) REAR BUMPER AND GRAB HANDLES FOR PICKUP TRUCKS AND THE LIKE

(76) Inventor: James Louis Duderstadt, San Antonio, TX (US)

( * ) Notice: Subject to any disclaimer, the term of this patent is extended or adjusted under 35 U.S.C. 154(b) by 109 days.

(21) Appl. No.: 13/135,114

(22) Filed: Jun. 24, 2011

Related U.S. Application Data (60) Provisional application No. 61/359,813, filed on Jun. 29, 2010, provisional application No. 61/373,257, filed on Aug. 12, 2010, provisional application No. 61/439,929, filed on Feb. 6, 2011.

(51) Int. Cl.
*B60R 19/48* (2006.01)
(52) U.S. Cl. ................. 293/117; 296/43
(58) Field of Classification Search .......... 293/102, 293/116, 117, 120; 296/1.02, 43, 62
See application file for complete search history.

(56) References Cited

U.S. PATENT DOCUMENTS

| | | | | |
|---|---|---|---|---|
| 1,099,924 A | * | 6/1914 | Johnson | 296/43 |
| 1,691,639 A | * | 11/1928 | Charlebois et al. | 296/43 |
| D198,126 S | * | 5/1964 | Cline | D12/169 |
| D212,939 S | | 12/1968 | Nunn | D14/6 |
| 4,266,817 A | * | 5/1981 | Mason et al. | 293/117 |
| 4,569,533 A | | 2/1986 | Gronert et al. | 280/163 |
| 4,605,098 A | | 8/1986 | Leuty | 182/92 |
| D297,924 S | | 10/1988 | Trinnaman | D12/169 |
| 4,785,910 A | | 11/1988 | Tonkovich | 182/92 |
| D316,070 S | | 4/1991 | Riss | D12/169 |
| 5,273,382 A | * | 12/1993 | Yearick | 411/64 |
| 5,340,177 A | * | 8/1994 | Maxam | 293/117 |
| 5,538,265 A | | 7/1996 | Chen et al. | 280/163 |
| 5,628,536 A | * | 5/1997 | Fulkerson | 293/117 |
| 5,685,594 A | * | 11/1997 | Harper | 296/51 |
| 5,868,412 A | * | 2/1999 | Hinkle | 280/163 |
| 6,612,595 B1 | * | 9/2003 | Storer | 280/163 |
| D490,755 S | | 6/2004 | Platto et al. | D12/169 |
| D491,496 S | | 6/2004 | Metros et al. | D12/169 |
| 6,764,123 B1 | * | 7/2004 | Bilyard | 296/61 |
| D497,851 S | | 11/2004 | Metros et al. | D12/169 |
| D501,809 S | | 2/2005 | Metros et al. | D12/169 |
| D507,998 S | | 8/2005 | Metros et al. | D12/169 |
| 7,090,276 B1 | * | 8/2006 | Bruford et al. | 296/62 |
| D531,556 S | | 11/2006 | Metros et al. | D12/169 |
| 7,377,563 B1 | * | 5/2008 | Demick | 293/116 |
| 7,416,232 B2 | | 8/2008 | Tier et al. | 293/117 |
| 7,527,308 B2 | * | 5/2009 | Buniewicz et al. | 293/117 |
| 7,530,619 B1 | * | 5/2009 | Bruford et al. | 296/62 |
| 8,251,423 B1 | * | 8/2012 | Lingle | 296/1.02 |
| 2001/0052712 A1 | * | 12/2001 | Fukushima et al. | 296/3 |
| 2002/0125677 A1 | * | 9/2002 | Knodle et al. | 280/166 |
| 2006/0049650 A1 | * | 3/2006 | Evans | 293/120 |
| 2008/0106106 A1 | * | 5/2008 | Lavoie | 293/117 |
| 2009/0273209 A1 | * | 11/2009 | Joab | 296/215 |
| 2012/0018975 A1 | * | 1/2012 | Salmon et al. | 280/166 |

* cited by examiner

*Primary Examiner* — Lori Lyjak
(74) *Attorney, Agent, or Firm* — Kammer Browning PLLC (57) ABSTRACT

Various wares are provided which alone and in combination with one another facilitate entry of a person into the cargo area of a vehicle, such as a pickup truck bed. A bumper is provided having increased access at its end portions and center, which function as steps in providing a first stepping level and a second stepping level. In combination with grab handles provided, entry of the cargo area of a vehicle is greatly facilitated, especially in the cases of vehicles having high suspension systems, and in cases of individuals of relatively short stature.

23 Claims, 13 Drawing Sheets

REAR BUMPER AND GRAB HANDLES FOR PICKUP TRUCKS AND THE LIKE

CROSS REFERENCE TO RELATED APPLICATIONS

This application claims the benefit of U.S. Provisional Application No. 61/359,813 filed on Jun. 29, 2010, and U.S. Provisional Application No. 61/373,257 filed on Aug. 12, 2010 and U.S. Provisional Application No. 61/439,929 filed on Feb. 6, 2011, the entire contents of which are all hereby incorporated herein by reference.

TECHNICAL FIELD

Inventions presented herein relate generally to systems for increasing ease of access into cargo areas present on motorized vehicles, including pickup trucks in some embodiments.

BACKGROUND OF THE INVENTION

Various types of motorized vehicles feature a cargo area, including pickup trucks having a cargo box, which is sometimes referred to as a "truckbed." Most new pickup trucks in current manufacture are not equipped with running boards at the time of their sale. Accordingly, when users of such a vehicle deem it desirable to enter the cargo box, they typically do so by stepping atop the rear bumper of the vehicle, or onto the tailgate when the tailgate is in its opened position. A recent trend is one in which vehicle designers have raised the bodies of pickup trucks using higher overall vehicle suspensions, which has effectively raised the distance above the ground of both the pickup truck's bumper and the tailgate when in its opened position. Moreover, increased bumper and tailgate heights from the ground have rendered it increasingly difficult, and in some instances almost impossible, for individuals to enter the cargo box of some pickup trucks and other motorized vehicles featuring a bumper and/or a tailgate that swings down to a horizontal position when open.

SUMMARY OF THE INVENTION

In some embodiments there are provided a bumper attached to a vehicle, the bumper having a length dimension, a first end portion, a second end portion, and a middle portion. There is a first stepping level to the bumper present at a first distance above the ground on which the vehicle rests, and there is a second stepping level to the bumper present at a second distance above the ground on which the vehicle rests, the second distance being greater than the first distance. The first stepping level has a presence at the first end portion, the middle portion and the second end portion of the bumper. The second stepping level has a presence at two separate locations along the length of the bumper, between any locations at which the first stepping level is present.

Grab handles are in some embodiments provided to be present at the top portion of the walls of a cargo box present on the vehicle, such grab handles may be fitted into stake pockets present on the vehicle, or alternately attached to a bed rail or grab rail, or alternately attached to a bed cap present on the vehicle. In some embodiments the grab handles feature the ability to undergo pivotal motion or retractable motion thus altering their position.

BRIEF DESCRIPTION OF THE DRAWINGS

Embodiments of systems and methods provided in this disclosure may take physical form in certain parts or elements and arrangement of parts or elements, some embodiments of which will be described in detail and illustrated in the accompanying drawings which form a part hereof, and wherein.

DETAILED DESCRIPTION

Figure 1:
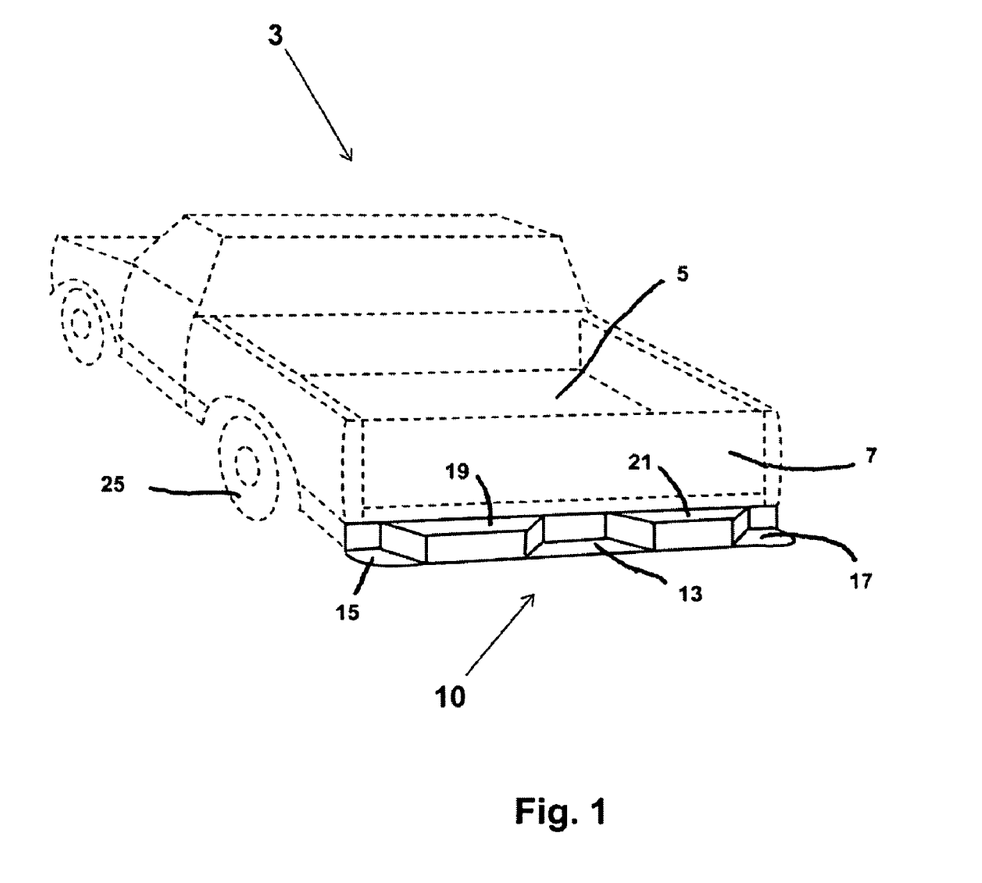
FIG. 1 shows a perspective view of the rear portion of a motorized vehicle in accordance with some embodiments of the disclosure.
Figure 2:
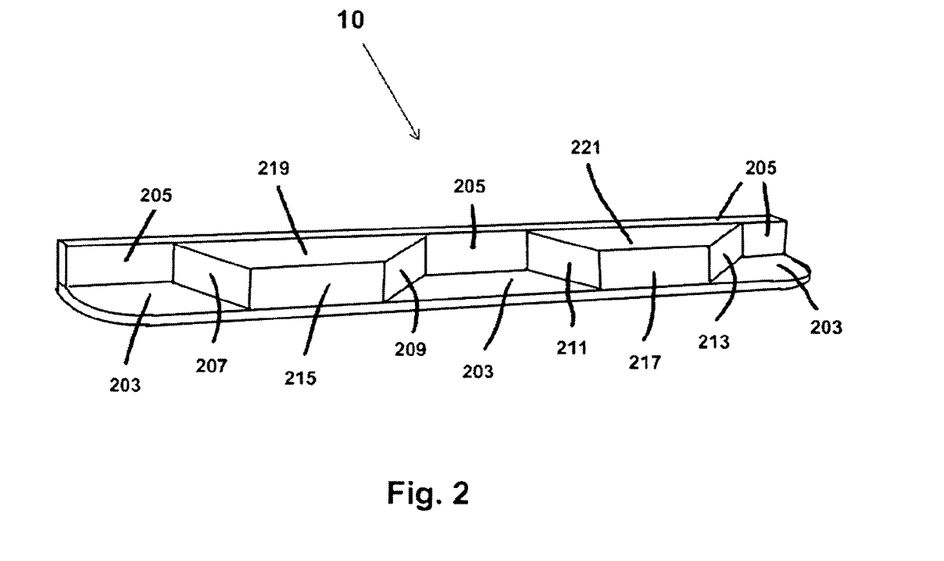
FIG. 2 shows a perspective view of a vehicle bumper in accordance with some embodiments of the disclosure.

Referring now to the drawings, wherein the showings are for the purpose of illustrating the invention only and not for the purpose of limiting the same. FIG. 1 shows a perspective view of the rear portion of a motorized vehicle 3 in accordance with some embodiments of the disclosure. Vehicle 3 is a pickup truck that features wheel 25, a cargo box 5, tailgate 7, and a bumper 10. In FIG. 2, bumper 10 itself includes a bumper center step surface 13, bumper first end step surface 15, bumper second end step surface 17, a first top surface 19 and a second top surface 21. In some embodiments, bumper 10 is configured such that bumper center step surface 13, bumper first end step surface 15, and bumper second end step surface 17 are co-planar. In some embodiments, bumper 10 is configured such that first top surface 19 and a second top surface 21 are co-planar. In some embodiments in which bumper 10 is configured such that bumper center step surface 13, bumper first end step surface 15, and bumper second end step surface 17 are all co-planar with one another, first top surface 19 and a second top surface 21 are also co-planar with one another, but on a different plane than bumper center step surface 13, bumper first end step surface 15, and bumper second end step surface 17. In some embodiments, the height from the ground of first top surface 19 and a second top surface 21 is greater than the height from the ground than are bumper center step surface 13, bumper first end step surface 15, and bumper second end step surface 17. Such configuration provides that first top surface 19 is elevated one-step-higher from the ground than are bumper center step surface 13 and bumper first end step surface 15, and that second top surface 21 is elevated one-step-higher from the ground than are bumper center step surface 13 and bumper second end step surface 17.

First end step surface 15 and second end step surface 17 comprise open side steps, onto which a person desirous of entering the cargo area or cargo box of a motorized vehicle can step, to gain access thereto. This is particularly useful when the tailgate of a pickup truck is in its open position, enabling a person to step on a location that is at a lesser distance from the ground upon which the vehicle rests, than the horizontal surface of the opened tailgate. However, such features also enable a person to step on them even when the tailgate is in its closed position.

Thus, provided in some embodiments is a vehicle bumper having a length dimension, a first end portion, a second end portion, and a middle portion. Bumper first end step surface 15, bumper center step surface 13 and bumper second end step surface 17 in some embodiments collectively define a first stepping level present at a first distance from the ground (and substantially parallel thereto) on which the vehicle rests. Bumper first end step surface 15 is present at the first end portion of the bumper and, as with all step surfaces referred to in this disclosure, is large enough to accommodate a foot or the footwear of a person. Bumper second end step surface 17 is present at the second end portion of the bumper. Bumper center step surface 13 is present at any selected location along the length of bumper 10 that is between bumper first end step surface 15 and bumper second end step surface 17. First top surface 19 and second top surface 21 in some embodiments collectively define a second stepping level present at a second distance from the ground on which the vehicle rests that is greater than the distance said first stepping level is from the ground. The second stepping level is present in two separate locations along the length of the bumper, between any location at which the first stepping level is present at the first end portion, such as at 15, and any location at which the first stepping level is present at the second end portion, such as 17. Bumper center step surface 13 is present along the length of the bumper at a location that is between the first top surface 19 and the second top surface 21, there being a discontinuity in the second stepping level at the location of bumper center step surface, as shown.

FIG. 2 shows a perspective view of rear bumper 10, in accordance with some embodiments of the disclosure, and describes one possible construct for the bumper shown and described in relation to FIG. 1. Bumper 10 may be herein referred to as a "side step bumper."

The bumper 10 of FIG. 2 is in some embodiments fabricated from ten pieces of planar stock material (203, 205, 207, 209, 211, 213, 215, 217, 219, and 221) each shaped substantially as a rectangular solid, which stock material is selected from the group consisting of metals, metallic alloys, composite materials, polymers, polymer alloys, and mixtures comprising two or more than two polymers, as such are known in the automotive arts as being useful in providing a bumper for a vehicle. In some embodiments, the stock materials selected comprise flat surfaces, such as in the cases when metallic sheet or plate stock is selected, as known in the art. In some embodiments, the stock materials selected may also comprise shapes such as angles, channels, beams or tubes, as known by those of ordinary skill in the art. In some embodiments, there is a base plate 203 and a second plate 205, each of which are essentially planar sheets of stock material (including steel) having any desired or selected thickness (typically between 2 millimeters and 30 millimeters) which are joined along their length dimension to intersect at an angle of 90 degrees, such as by a weld. In some embodiments, first left panel 207, left front panel 215, first right panel 209, second left panel 211, right front panel 217, and second right panel 213 are each attached to base plate 203 such that they form a substantially perpendicular angle therewith, using conventional fastening means, including welds. In some embodiments, first left panel 207, left front panel 215, first right panel 209 are attached to left top panel 219 such that they form a substantially perpendicular angle therewith, using conventional fastening means, including welds. For some embodiments, top left panel 219 is attached to second plate 205 such that its surface is substantially parallel to the surface of base plate 203, using conventional fastening means, including welds. As evident from FIG. 2, when viewed from an overhead perspective it would be seen that first left panel 207, first right panel 209, second left panel 211, and second right panel 213 each intersect second plate 205 at an angle. Suitable angles of intersections for these elements with second plate 205 are any angle in the range of between 30 degrees and 150 degrees, including all degrees of angle and ranges of degrees of angles therebetween. For various embodiments, the physical dimensions of left top panel 219 and right top panel 221 are readily adjustable by engineering or design personnel to accommodate the angle of intersection selected for first left panel 207, first right panel 209, second left panel 211, and second right panel 213 with second plate 205, so that a completely closed box structure results. That is, such that first left panel 207, first right panel 209, left front panel 215, left top panel 219 a portion of base plate 203 and a portion of second plate 205 collectively constitute the walls of an enclosure having the shape of a hollow three-dimensional trapezoid, or trapezoidal prism. Similarly, in some embodiments second left panel 211, second right panel 213, right front panel 217, right top panel 221, a portion of base plate 203 and a portion of second plate 205 collectively constitute the walls of an enclosure having the shape of a hollow trapezoid. In some embodiments bumper 10 is provided as having been made of singular construction, i.e., as a one-piece article (unitary construction) made by a plastic injection moulding process, metal stamping or casting, forging, etc.

Figure 3:
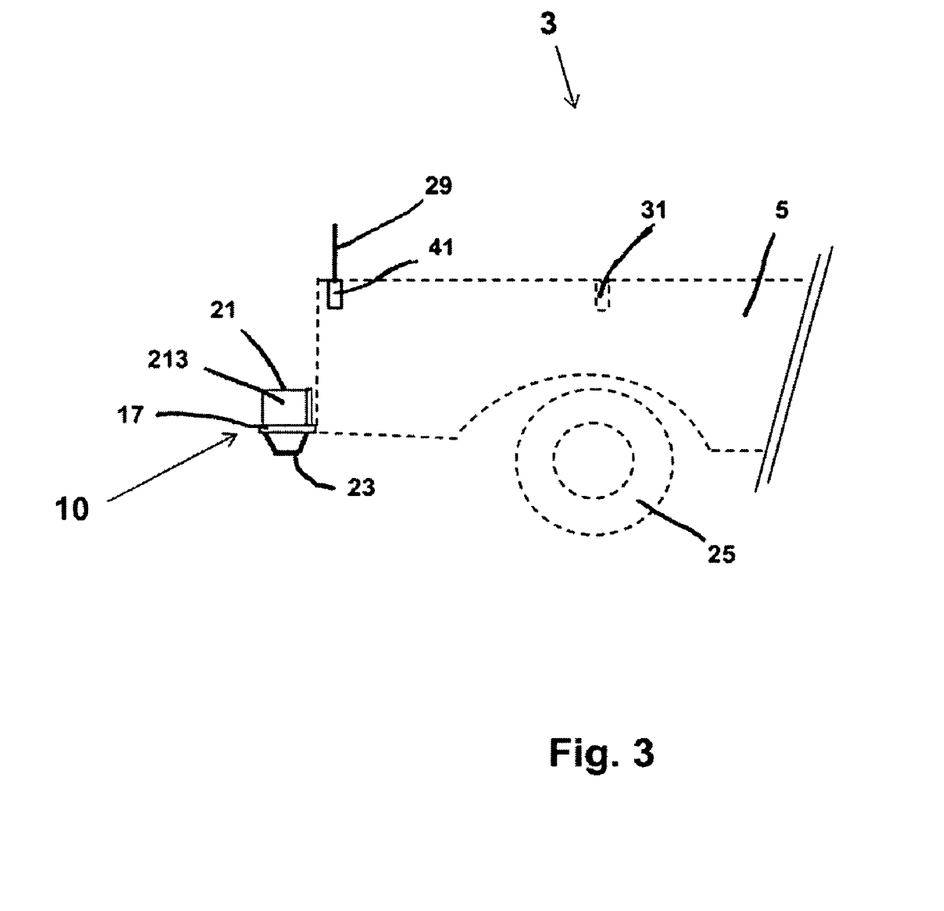
FIG. 3 shows a side view of the rear portion of a motorized vehicle in accordance with some embodiments of the disclosure.

FIG. 3 shows a side perspective view of the rear portion of a motorized vehicle 3 in accordance with some embodiments of the disclosure, including those shown and described with reference to FIG. 2, illustrating the respective locations of cargo box 5, wheel 25, bumper second end step surface 17, second right panel 213, second top surface 21, and optional rung 23. Rung 23 when selected to be present in some embodiments comprises a loop of metal or metallic alloy that is attached to the bumper of the vehicle, such as bumper 10, sufficiently to enable a person to step on rung 23 when entering or accessing cargo box 5. Also shown are grab handle 29, insert 41 and stake pocket 31.

Figure 4:
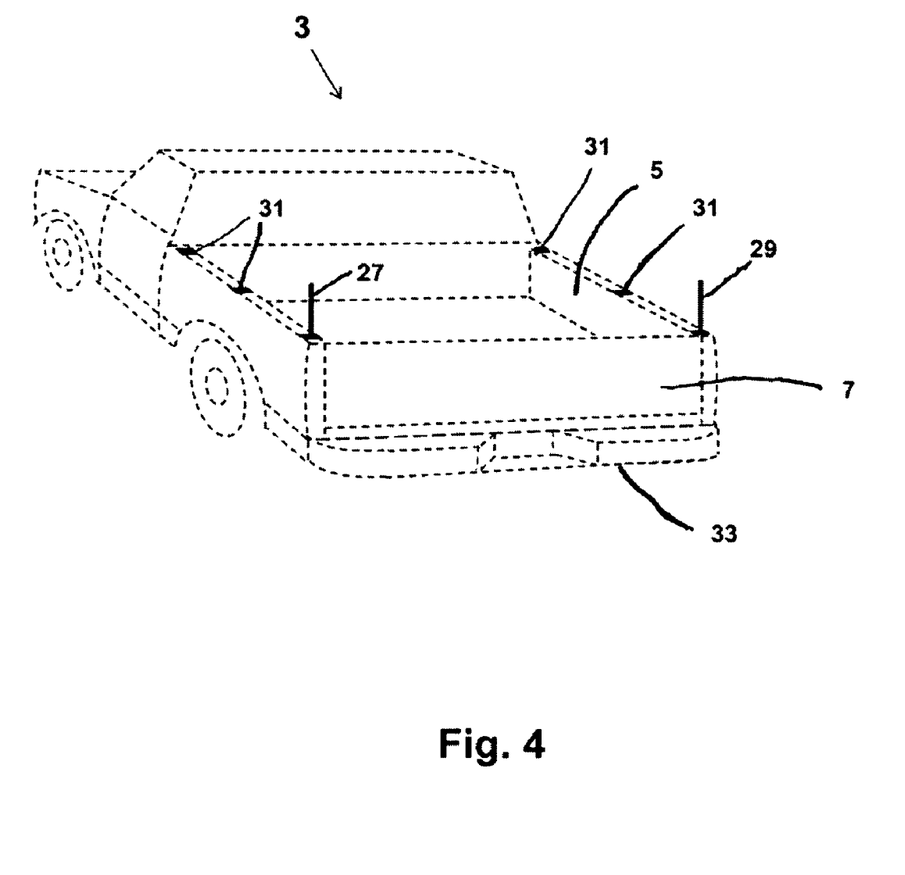
FIG. 4 shows a perspective view of the rear portion of a motorized vehicle in accordance with some embodiments of the disclosure.

In FIG. 4 is shown a perspective view of the rear portion of a motorized vehicle 3 in accordance with some embodiments of the disclosure. In FIG. 4, vehicle 3 features a cargo box 5 that is open to the surroundings, which as is typical, includes a floor portion that is surrounded by three walls and is bound on one end by tailgate 7 that can be selectively opened and closed. Disposed along the top portions of two of the opposite walls of cargo box 5 are a plurality of stake pockets 31, as are known in the art. Stake pockets are basically holes atop the opposite walls of a cargo box 5 into which vehicle owners or operators can insert items such as wooden stakes, for any desired purpose, which often relates to the positional stabilization of cargo present in cargo box 5 during vehicle travel through additional use of wires, cords, tie-downs, etc. Bumper 33 is present and in some embodiments is a conventional bumper. In other embodiments bumper 33 has the configuration as was shown and described with reference to bumper 10. Also shown in FIG. 4 are grab handles 27 and 29 according to the disclosure, illustrated in a useful position of theirs, each being present in stake holes 31 (not labeled) that are disposed approximately at the rear corners of the cargo box. Such location enables a person standing on the ground to grasp grab handle 27 or 29, put their foot on bumper 33 and lift themselves up onto the vehicle to gain access to cargo box 5.

Figure 5:
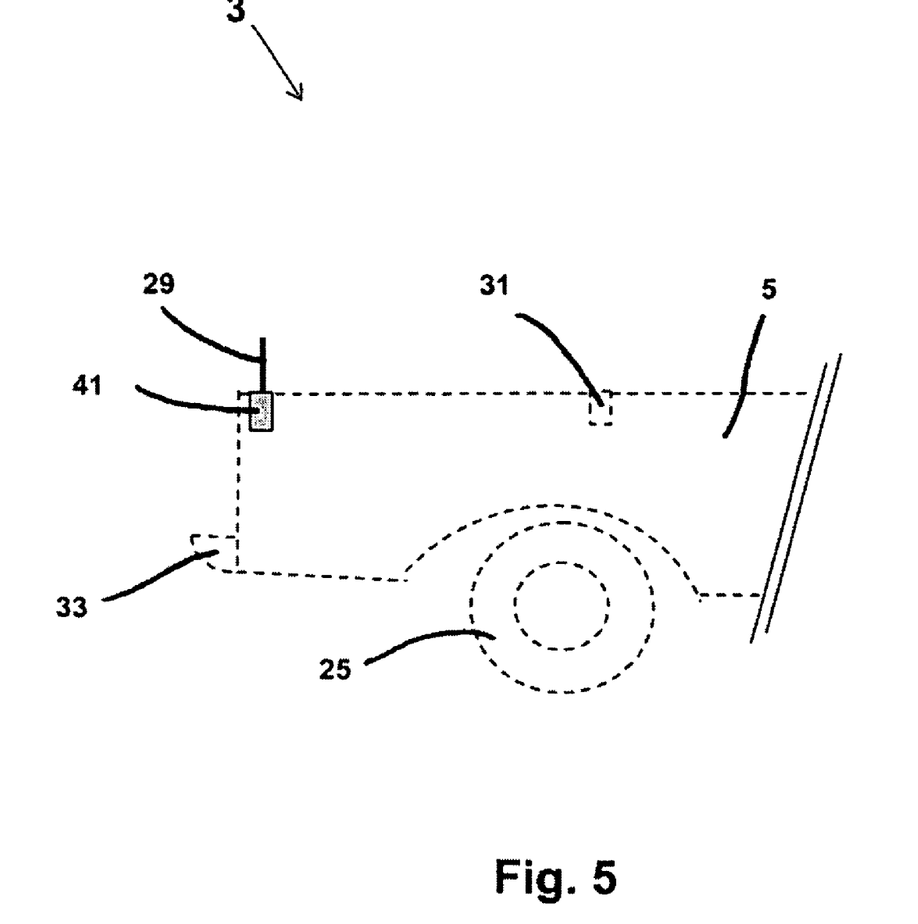
FIG. 5 shows a side cutaway view of the rear portion of a motorized vehicle in accordance with some embodiments of the disclosure.
Figure 6:
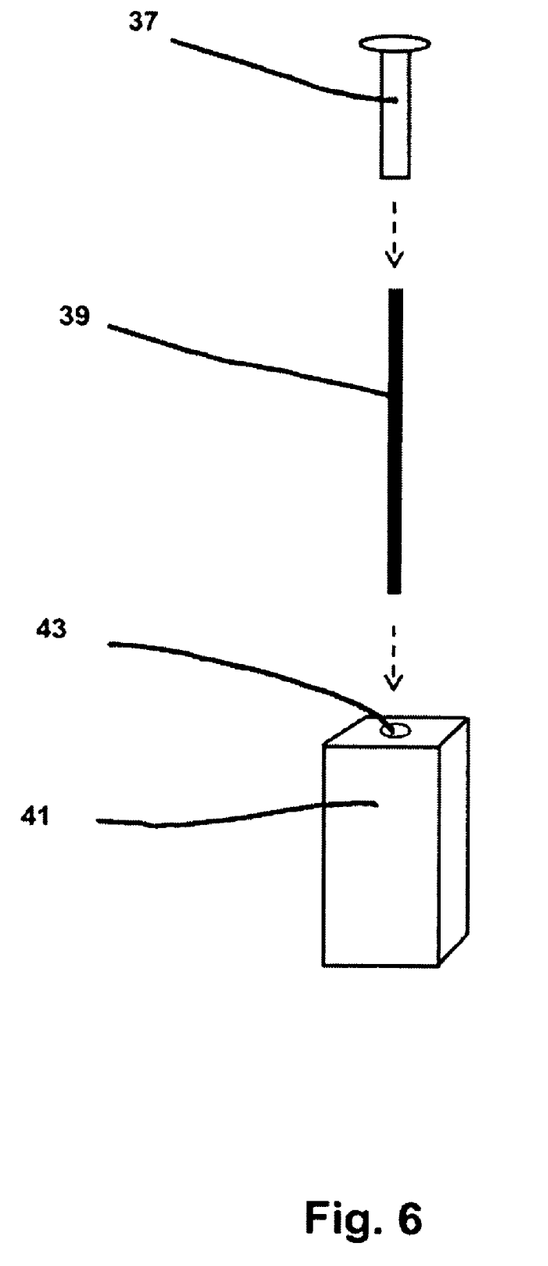
FIG. 6 shows an exploded view of components useful in providing a grab handle in accordance with some embodiments of the disclosure.

FIG. 5 shows a side cutaway view of the rear portion of a vehicle 3 in accordance with some embodiments of the disclosure, including embodiments shown and described concerning FIG. 4. In FIG. 5 are shown the respective locations of cargo box 5, wheel 25, stake pocket 31, bumper 33, grab handle 29 and insert 41. Insert 41 is shown in more detail in FIG. 6, which is an exploded view of components useful in providing a grab handle in accordance with some embodiments of the disclosure. Insert 41 is in some embodiments a plastic insert that is dimensioned sufficiently to be inserted into a stake pocket 31 and provide a snug fit against the inner walls or features present inside stake pocket 31. Insert 41 includes a hole 43 disposed through it to a depth sufficient to maintain rod 39 in a substantially stationary position therein. Rod 39 in some embodiments is a solid bar or rod of steel, in others it is a hollow tube; however, rod 39 can be comprised of any metal or metallic alloy, composite material, polymer, polymer alloy, or polymer mixture. In some embodiments, rod 39 includes at least one hole disposed therethrough whose axis is substantially perpendicular and in some embodiments perpendicular to the length dimension of rod 39, to enable pins, rods or any other suitable ware to be inserted therethrough to maintain rod 39 at any desired location within insert 41 when the assembly of FIG. 6 is disposed in a stake pocket 31. Such feature enables the grab handle in some embodiments to be selectively lockable. Handle 37 functions as a grip being akin to handle bar grips made of rubber or other soft polymer as found on bicycles and like employments and is dimensioned to have a hole that enables it to be slid over the end portion of rod 39 as shown in FIG. 6 in order to provide a good solid grip for the grab handle.

Figure 7:
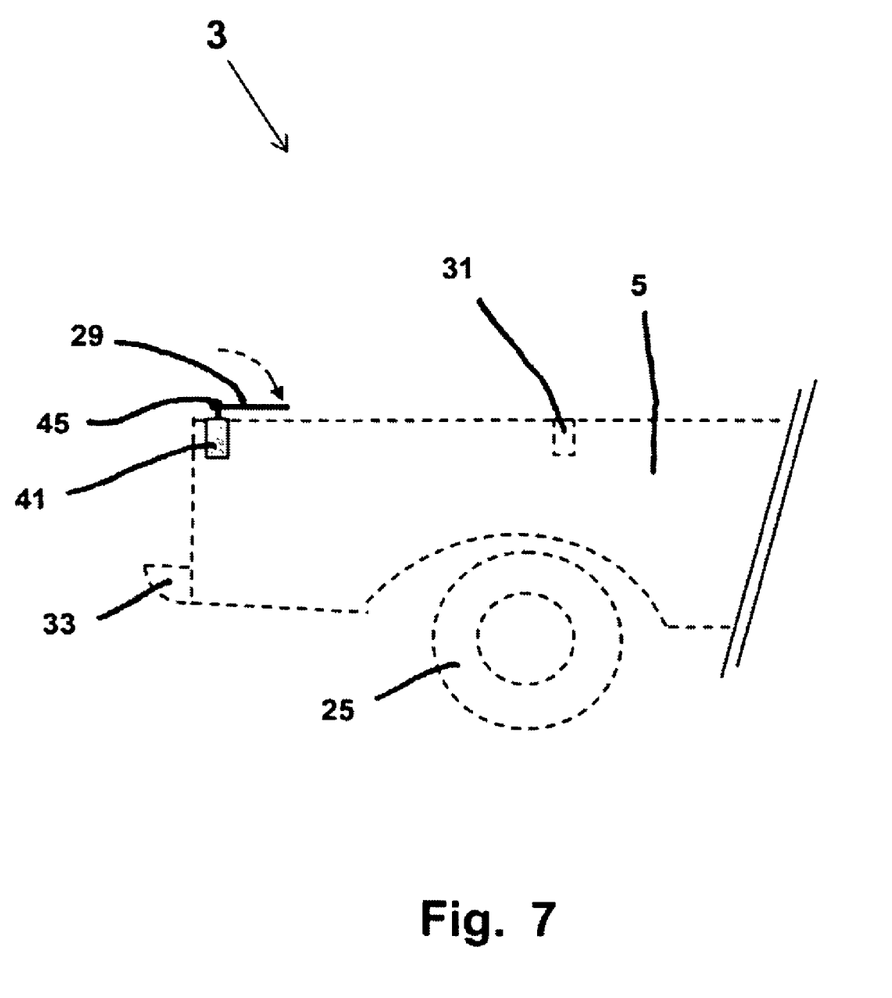
FIG. 7 shows a side view of the rear portion of a motorized vehicle in accordance with some embodiments of the disclosure.

FIG. 7 shows a side cutaway view of the rear portion of a vehicle 3 in accordance with some embodiments of the disclosure. In FIG. 7 are shown the respective locations of cargo box 5, wheel 25, stake pocket 31, bumper 33, grab handle 29 and insert 41. In some embodiments, grab handles 27, 29 include a pivot point 45, at which the grab handles can be bent down as shown by the dotted arrow in FIG. 7 versus the embodiments illustrated by FIG. 5. Pivot point 45 is achieved using any means or hardware known in the art for providing such a pivot on a rod 39 which also provides for its being lockable in the vertical position illustrated in FIG. 5. In some embodiments a metallic sleeve or tube having dimension sufficiently slightly greater than the outer dimension of rod 39 is slid over rod 39 at the pivot point 45 to lock the pivot point and prevent the rod 39 from pivoting, when the sleeve is so located. To unlock the pivot point, the sleeve is slid off from the pivot point.

Figure 8A:
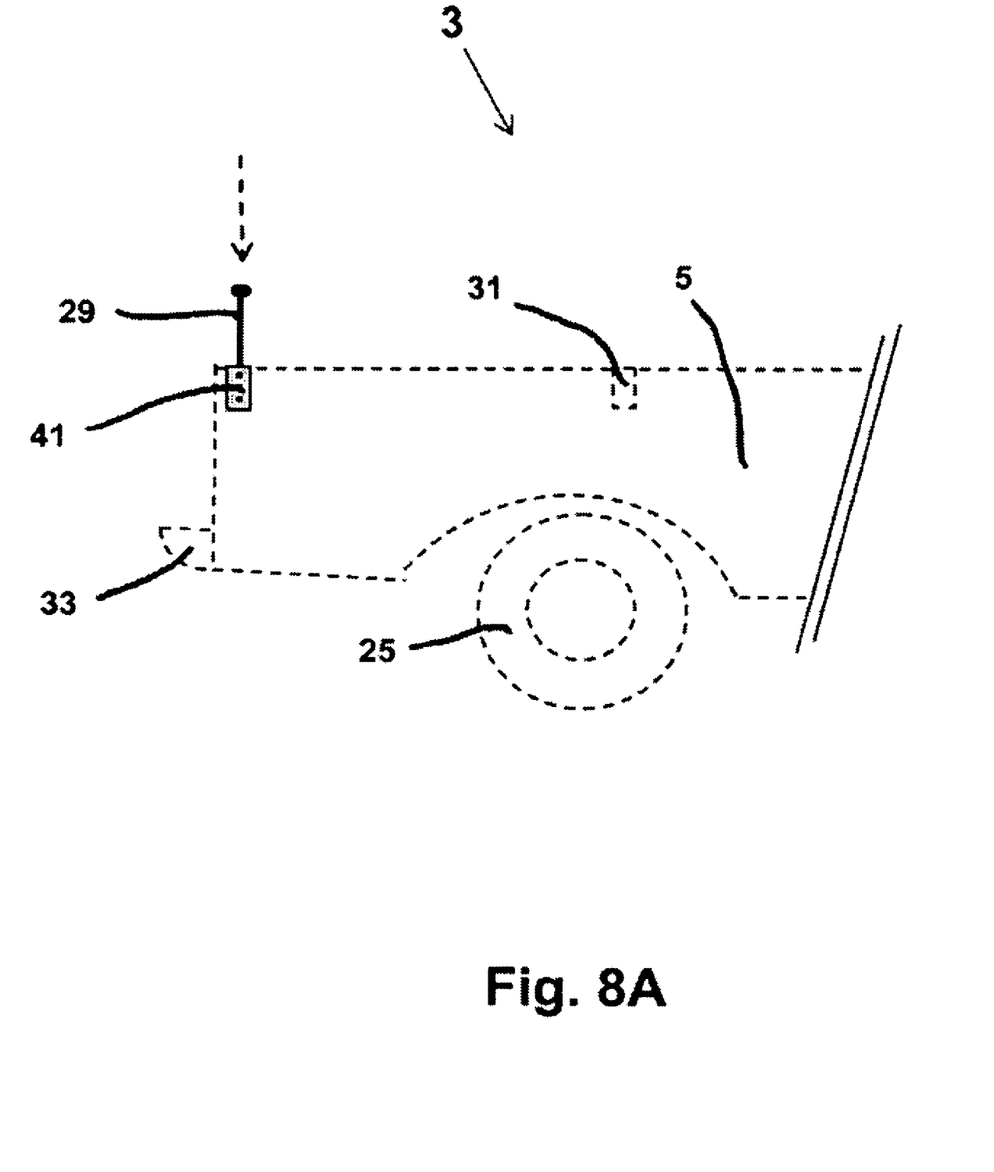
FIG. 8A shows a side view of the rear portion of a motorized vehicle in accordance with some embodiments of the disclosure.
Figure 8B:
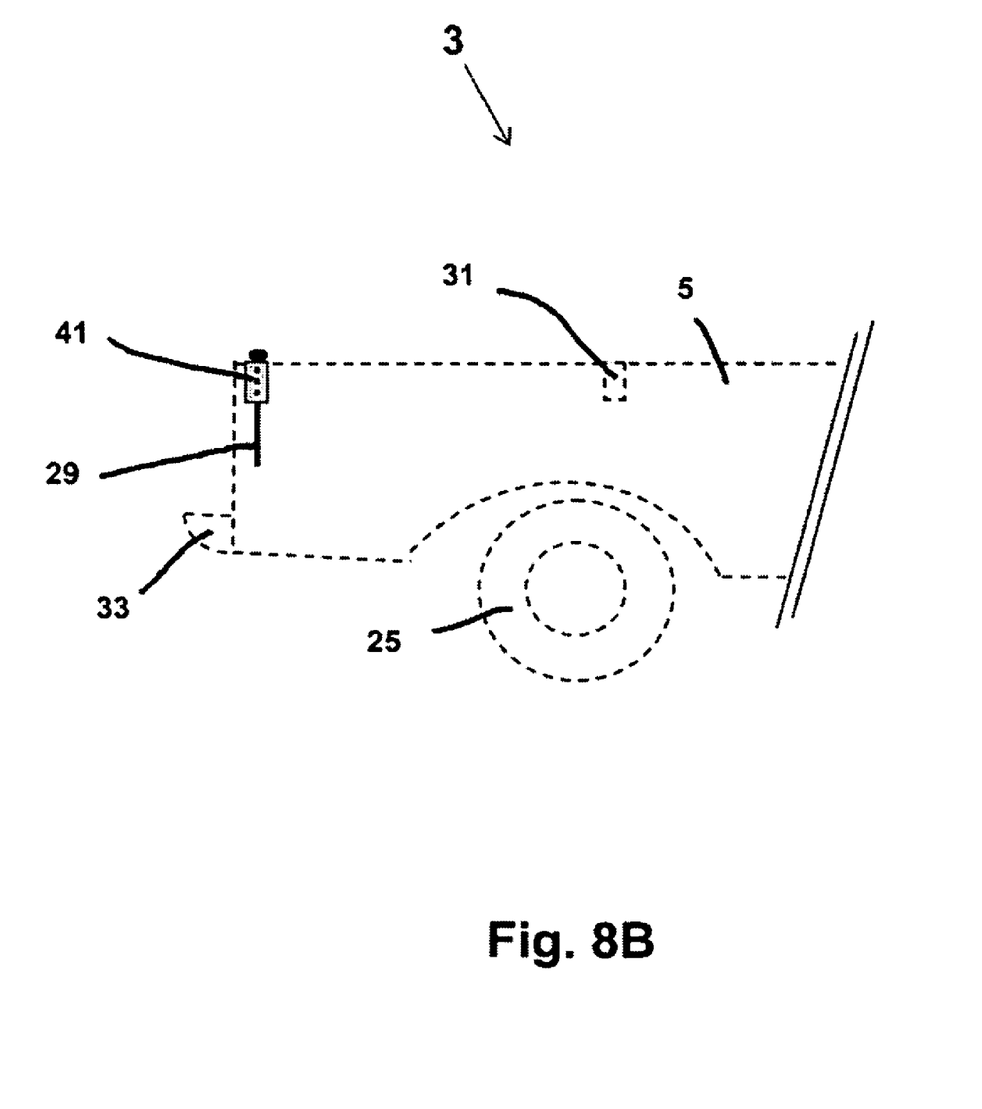
FIG. 8B shows a side view of the rear portion of a motorized vehicle in accordance with some embodiments of the disclosure.

FIG. 8A shows a side cutaway view of the rear portion of a vehicle 3 in accordance with some embodiments of the disclosure. In FIG. 8A are shown the respective locations of cargo box 5, wheel 25, stake pocket 31, bumper 33, grab handle 29 and insert 41. In some embodiments, rod 39 can be pushed downwardly through insert 41 (as shown in FIG. 8B), in embodiments for which hole 43 passes completely through insert 41. Appropriate dimensioning of hole 43, choice of material from which insert 41 is constructed, and appropriate dimensioning of the outer diameter of rod 39 provides in some embodiments for an interference fit between insert 41 and rod 39 to exist that is sufficient to provide rod 39 to be maintained at any position along its possible travel within insert 41. Rod 39 is in some embodiments maintained in the position depicted in FIG. 8A using any conventional hardwares known by those of ordinary skill in the art, including without limitation clamps, pins, and bolts present in a bore through rod 39 at any selected location, which bore has an axis that is perpendicular to the longest length dimension of rod 39. Removal of such pin, etc. from said bore enables grab handle 29 to go from its position of FIG. 8A to its position shown in FIG. 8B, either by gravity or with added force from a user.

Figure 9A:
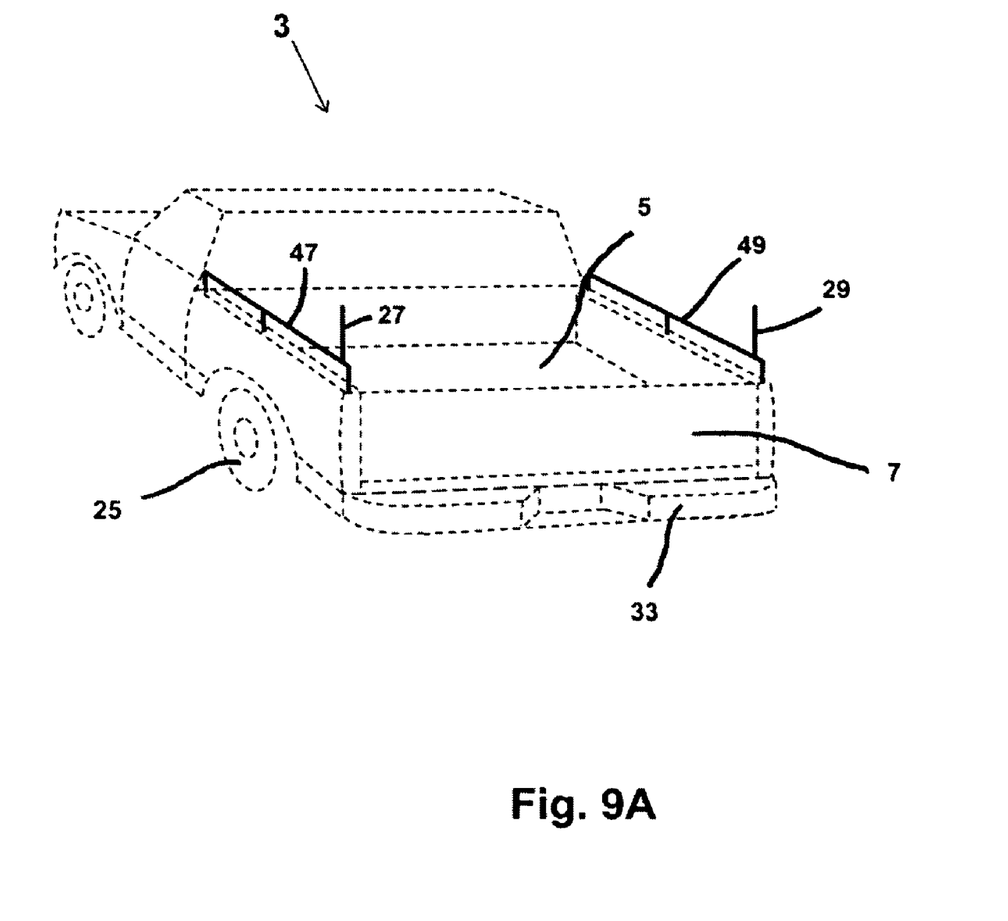
FIG. 9A shows a perspective view of the rear portion of a motorized vehicle in accordance with some embodiments of the disclosure.

FIG. 9A shows a perspective view of the rear portion of a vehicle 3 in accordance with some embodiments of the disclosure. Shown in this view are the respective locations of cargo box 5, tailgate 7, bumper 33, and wheel 25. The pickup bed includes the features of first bed rail 47 (sometimes referred to in the art as a "grab rail") and second bed rail 49 (sometimes referred to in the art as a "grab rail") disposed along the top portion or edge of two wall portions of cargo box 5 as shown. Bed rails 47, 49 are typically attached to the pickup bed using means and wares known to those of ordinary skill in the art. Further provided are first grab handle 27 and second grab handle 29, each being attached directly to the respective bed rails 47 and 49 using any means or wares known to those of ordinary skill in the art.

Figure 9B:
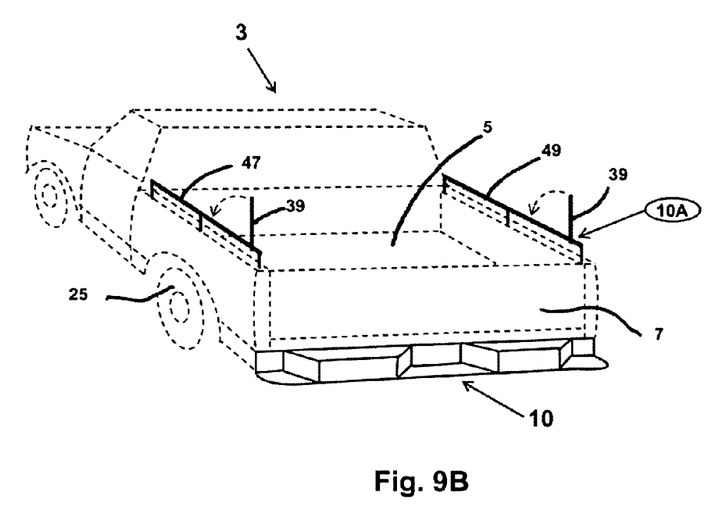
FIG. 9B shows a perspective view of the rear portion of a motorized vehicle in accordance with some embodiments of the disclosure.
Figure 10A:
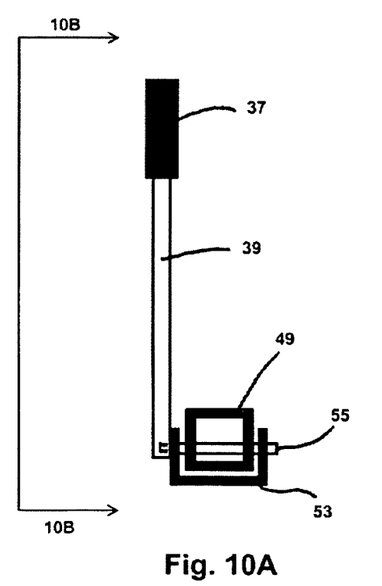
FIG. 10A shows a frontal view of a combination useful in providing a grab handle in accordance with some embodiments of the disclosure.
Figure 10B:
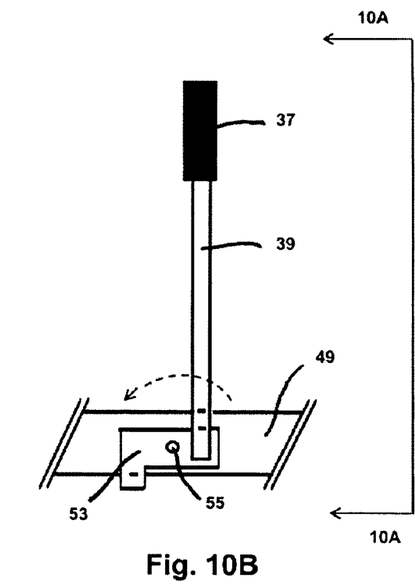
FIG. 10B shows a side view of a combination useful in providing a grab handle in accordance with some embodiments of the disclosure.

FIG. 9B shows a perspective view of the rear portion of a vehicle 3 in accordance with some embodiments of the disclosure. Shown in this view are the respective locations of cargo box 5, tailgate 7, bumper 10, and wheel 25. The pickup bed includes the features of first bed rail 47 and second bed rail 49 disposed along the top portion or edge of two wall portions of cargo box 5 as shown. Rod 39 of grab handle that is attached to bed rail 49 is shown in its vertical position, but can be folded down as indicated by the dashed arrow to be parallel with bed rail 49. FIG. 10A shows a frontal perspective view of a combination useful in providing a grab handle in accordance with some embodiments of the disclosure. Shown is tube-shaped bed rail 49 and u-shaped channel stock 53 having two wall portions and a floor portion, with rod 39 attached to one of its side walls. Bolt, shaft, or pin 55 is disposed through the walls of channel stock 53 and bed rail 49 as shown therein. Such an arrangement provides a sturdy method for the grab handle to be pivotally mounted to the bed rail. FIG. 10B shows a side perspective view of a combination useful in providing a grab handle in accordance with some embodiments of the disclosure. The bottom portion of u-shaped channel 53 which extends below bed rail 49 also limits the rotation of the grab handle to the vertical or near-vertical position when placed in the upright position as shown in FIG. 10B.

Figure 11:
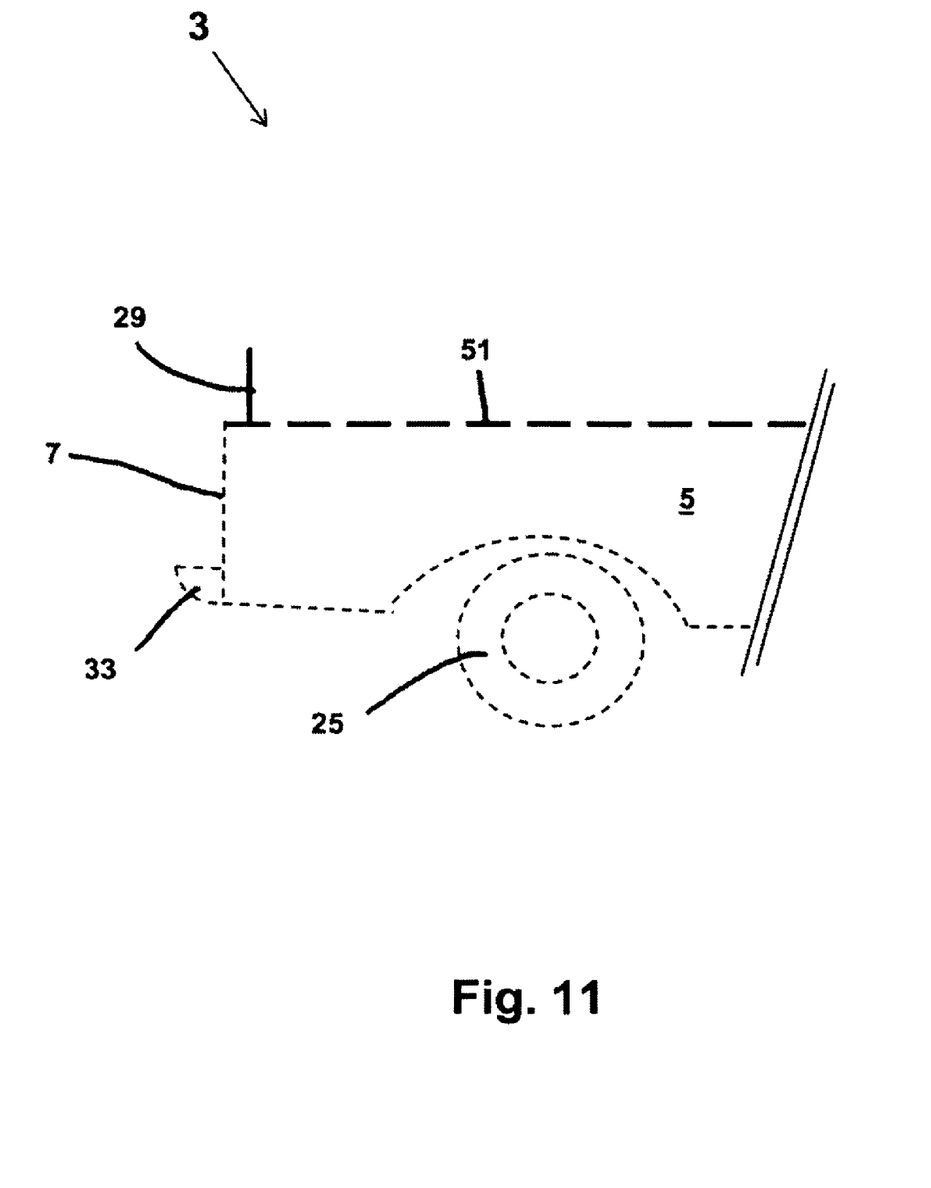
FIG. 11 shows a side view of the rear portion of a motorized vehicle in accordance with some embodiments of the disclosure.

FIG. 11 shows a side perspective view of the rear portion of vehicle 3 in accordance with some embodiments of the disclosure, showing the respective locations of cargo box 5, wheel 25, tail gate 7 and bumper 33. Also shown is pickup bed cap 51, which is essentially a protective cover attached to and fitted along the top of the side walls of cargo box 5. Pickup bed caps are typically made from polymeric materials, but are in some cases made from metallic alloys suitable for mounting pickup bed rails, tool boxes or other equipment. In FIG. 11 grab handle 29 is depicted as being attached directly to pickup bed cap 51, such as by welds or other conventional attachment means or wares known to those skilled in the art.

Figure 12:
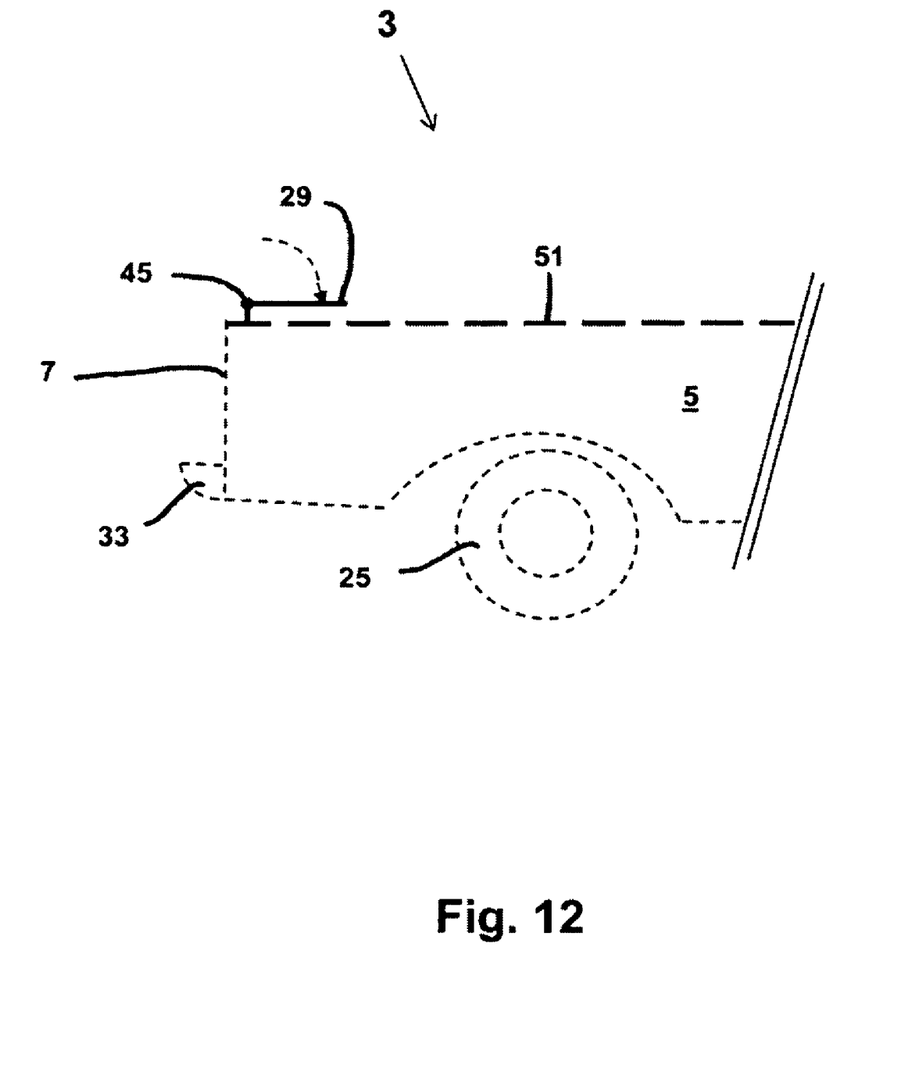
FIG. 12 shows a side view of the rear portion of a motorized vehicle in accordance with some embodiments of the disclosure.

FIG. 12 shows a side perspective view of the rear portion of vehicle 3 in accordance with some embodiments of the disclosure, showing the respective locations of cargo box 5, wheel 25, tail gate 7, bumper 33, and pickup bed cap 51. Also depicted is grab handle 29 attached directly to pickup bed cap 51, such as by welds or other conventional attachment means or wares known to those skilled in the art. Grab handle 29 in some embodiments includes a pivot point 45, at which the grab handle can be bent down as shown by the dotted arrow in FIG. 12 versus the embodiments illustrated by FIG. 11. Pivot point 45 is achieved using any means or hardware known in the art for providing such a pivot on a rod 39 which also provides for its being lockable in the vertical position illustrated in FIG. 11.

Consideration must be given to the fact that although this invention has been described and disclosed in relation to certain preferred embodiments, equivalent modifications and alterations thereof may become apparent to persons of ordinary skill in this art after reading and understanding the teachings of this specification, drawings, and the claims appended hereto. The present disclosure includes subject matter defined by any combinations of any one or more of the features provided in this disclosure with any one or more of any other features provided in this disclosure. These combinations include the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. These combinations also include combination of the features and/or limitations of one or more of the independent claims with features and/or limitations of another independent claims to arrive at a modified independent claim, with the remaining dependent claims in their original text or as modified per the foregoing, being read and applied to any independent claim so modified. The present invention has been disclosed and claimed with the intent to cover modifications and alterations that achieve substantially the same result as herein taught using substantially the same or similar structures, being limited only by the scope of the claims which follow.

The invention claimed is:

1. A bumper for a vehicle, comprising:
 a) a length dimension, a first end portion, a second end portion, and a middle portion;
 b) a first stepping level present at a first distance from the ground on which said vehicle rests;
 c) a second stepping level present at a second distance from the ground on which said vehicle rests, said second distance being greater than said first distance,
said first stepping level having a presence at said first end portion and said second end portion of said bumper, said second stepping level having a presence at two separate locations along the length of said bumper, between any location at which said first stepping level is present at said first end portion and any location at which said first stepping level is present at said second end portion.

2. A bumper according to claim 1 wherein said first stepping level has a presence at any location between said two separate locations of said second stepping level.

3. A bumper according to claim 1 wherein said first stepping level has a surface that is trapezoidal in shape.

4. A bumper according to claim 1 wherein said second stepping level has a surface that is trapezoidal in shape.

5. A bumper according to claim 1 wherein said surface of said second stepping level comprises the top surface of a trapezoidal prism.

6. A bumper according to claim 1 further comprising a rung having a rung stepping surface attached thereto at either end portion of said bumper, and optionally both, sufficiently to enable a person to step into said rung, said rung stepping surface being distanced from the ground any amount less than said first distance.

7. A grab handle insertable into a stake pocket of a pickup truck, said stake pocket having inner contours, said grab handle comprising:
 a) an insert that is configured with exterior contours that substantially coincide with the inner contours of said stake pocket, said insert comprising a hole having a cross-section;
 b) a rod having a length dimension, a first end portion, a second end portion, and a cross-section of slightly less dimension than said hole, any selected portion of said rod being disposed in said hole; and
 c) a grip present on an end portion of said rod.

8. A grab handle according to claim 7 wherein said rod includes a pivot point disposed at any selected location along its length, said pivot point being selectively lockable.

9. A grab handle according to claim 7 wherein said hole is a bore that extends all the way through said insert, said rod being selectively lockable at any desired position within said bore.

10. A vehicle comprising a cargo box having opposite walls which include a plurality of stake pockets present thereon, and further comprising at least one grab handle according to claim 7 present in at least one of said stake pockets.

11. A grab handle comprising
 a) a section of u-shaped channel stock having a floor portion and two wall sections, said wall sections each having a hole disposed therethrough, on a common axis;
 b) a rod having a first end portion and a second end portion, said rod being attached to one of said wall sections substantially at its first end portion; and
 c) a grip present on said second end portion of said rod.

12. A vehicle having a cargo box that includes bed rails present at the tops of opposite wall portions of said cargo box, and further comprising a grab handle attached to at least one of said bed rails, said grab handle comprising:
 a) a section of u-shaped channel stock having a floor portion and two wall sections, said wall sections each having a hole disposed therethrough on a common axis;
 b) a rod having a first end portion and a second end portion, said rod being attached to one of said wall sections substantially at its first end portion,
said grab handle being pivotally attached to said bed rail by means of a fastener disposed commonly through a hole present through said bed rail and the holes present in said wall sections.

13. A vehicle having a cargo box that includes bed rails present at the tops of opposite wall portions of said cargo box, and further comprising a grab handle attached to at least one of said bed rails, said grab handle comprising a rod that is vertically-disposed with respect to the ground on which said vehicle rests.

14. A vehicle according to claim 13 wherein said rod includes a pivot point disposed at any selected location along its length, said pivot point being selectively lockable.

15. A vehicle having a cargo box and a bumper, said bumper comprising:
   a) a length dimension, a first end portion, a second end portion, and a middle portion;
   b) a first stepping level present at a first distance from the ground on which said vehicle rests;
   c) a second stepping level present at a second distance from the ground on which said vehicle rests, said second distance being greater than said first distance,
said first stepping level having a presence at said first end portion and said second end portion of said bumper, said second stepping level having a presence at two separate locations along the length of said bumper, between any location at which said first stepping level is present at said first end portion and any location at which said first stepping level is present at said second end portion.

16. A vehicle according to claim 15, further comprising a plurality of stake pockets having inner contours present at the top portion of opposite walls of said cargo box, and further comprising at least one grab handle present in at least one of said stake pockets, said grab handle comprising:
   a) an insert that is configured with exterior contours that substantially coincide with the inner contours of said stake pocket, said insert comprising a hole having a cross-section;
   b) a rod having a length dimension, a first end portion, a second end portion, and a cross-section of slightly less dimension than said hole, any selected portion of said rod being disposed in said hole; and
   c) a grip present on an end portion of said rod.

17. A vehicle according to claim 15 wherein said cargo box includes bed rails present at the tops of opposite wall portions of said cargo box, and further comprising a grab handle attached to at least one of said bed rails.

18. A vehicle according to claim 17 wherein said grab handle comprises a rod that is attached to said bed rail so as to be oriented vertically.

19. A vehicle according to claim 17 wherein said grab handle comprises:
   a) a section of u-shaped channel stock having a floor portion and two wall sections, said wall sections each having a hole disposed therethrough on a common axis;
   b) a rod having a first end portion and a second end portion, said rod being attached to one of said wall sections substantially at its first end portion,
said grab handle being pivotally attached to said bed rail by means of a fastener disposed commonly through a hole present through said bed rail and the holes present in said wall sections.

20. A vehicle according to claim 19 wherein said rod includes a pivot point disposed at any selected location along its length, said pivot point being selectively lockable.

21. A vehicle according to claim 15 wherein said cargo box includes pickup bed caps present at the tops of opposite wall portions of said cargo box, and further comprising a grab handle attached to at least one of said pickup bed caps.

22. A vehicle according to claim 21 wherein said grab handle comprises a rod that is attached to said pickup bed cap so as to be oriented vertically.

23. A vehicle according to claim 22 wherein said rod includes a pivot point disposed at any selected location along its length, said pivot point being selectively lockable.

\* \* \* \* \*